United States Patent [19]

Melamed et al.

[11] Patent Number: 4,896,949
[45] Date of Patent: Jan. 30, 1990

[54] ACOUSTO-OPTIC TUNABLE BANDPASS FILTER WITH STRONG SIDEBAND SUPPRESSION

[75] Inventors: Nathan T. Melamed, Pittsburgh; Richard A. Elco, Upper Allen Township, Cumberland County, both of Pa.

[73] Assignee: Westinghouse Electric Corp., Pittsburgh, Pa.

[21] Appl. No.: 186,872

[22] Filed: Apr. 27, 1988

[51] Int. Cl.⁴ ............................................. G02F 1/11
[52] U.S. Cl. ................................................. 350/358
[58] Field of Search ............................... 350/358, 353

[56] References Cited

U.S. PATENT DOCUMENTS

| | | |
|---|---|---|
| 3,729,250 | 4/1973 | Kustere et al. |
| 3,729,251 | 4/1973 | Hearn. |
| 3,759,603 | 9/1973 | Eschler ............................ 350/358 |
| 3,928,814 | 12/1975 | Feichtner. |
| 4,040,722 | 8/1977 | Nielson. |
| 4,052,121 | 10/1977 | Chang ......................... 350/358 X |
| 4,110,016 | 8/1978 | Berg et al. ....................... 350/358 |
| 4,206,347 | 6/1980 | Avicola ....................... 350/358 X |
| 4,602,852 | 7/1986 | Moroz ............................ 350/358 |
| 4,639,092 | 1/1987 | Gottlieb ....................... 350/358 X |
| 4,653,869 | 3/1967 | Gottlieb ....................... 350/358 X |

FOREIGN PATENT DOCUMENTS

| | | | |
|---|---|---|---|
| 0079411 | 6/1980 | Japan ............................. 350/358 |
| 0164718 | 10/1982 | Japan ............................. 350/358 |

*Primary Examiner*—Eugene R. LaRoche
*Assistant Examiner*—Nathan W. McCutcheon

[57] ABSTRACT

A method and apparatus for improving the bandpass characteristic of an acousto-optic tunable filter in which two optically birefringement crystal parts are oriented so that their respective optic axes are tilted with respect to each other. The amount of tilt as well as the angle of incidence to the first part is selected so as to subject the light to a first bandpass characteristic in a first part of the crystal and a second bandpass characteristic in a second part of the crystal such that the bandpass characteristics have a common center frequency. When the bandpass characteristics have a ratio of 1.5, sideband suppression is significantly improved.

6 Claims, 1 Drawing Sheet

ACOUSTO-OPTIC TUNABLE BANDPASS FILTER WITH STRONG SIDEBAND SUPPRESSION

BACKGROUND OF THE INVENTION

The present invention relates to an acousto-optic tunable filter (hereinafter "AOTF"), and more particularly, to a method and apparatus for improving the bandpass characteristic of an acousto-optic filter. Acousto-optic tunable filters can comprise a variety of designs such as collinear, non-collinear and acousto-optic dispersive light filter (hereinafter "AODLF"). The design and operation of an AODLF is described in U.S. Pat. No. 4,639,092 and U.S. Pat. No. 4,653,869, both assigned to the same assignee of the subject application, and which are hereby incorporated by reference.

In general, the transmission characteristic of an acousto-optic filter is defined by:

$$T = T_0 \mathrm{sinc}^2 \frac{(\lambda - \lambda_0)}{a} \tag{1}$$

where $T_0$ is the peak value of the transmission, $\lambda_0$ is the center wavelength, "a" is the 4 dB bandwidth, and $$\mathrm{sinc}\, x = \frac{\sin \pi x}{\pi x} \tag{2}$$

An acousto-optic light filter depends upon optical diffraction to achieve filtering. Thus, the transmission of the filter refers to the diffracted beam, and the undiffracted beam passes through the filter and is eliminated by, for example, polarizers or spatial discrimination.

The solid line in FIG. 1 represents a plot of the function expressed by equation (1). The solid waveform in FIG. 1 has a bandwidth of "a" (at the 4 dB point from its peak). The amplitude of the solid waveform sidebands diminishes as shown in FIG. 1 and as defined by equation 1. The zero points of the transmission occur at $|\lambda - \lambda_0| = na$ where n is an integer. The maxima of the transmission are spaced nearly halfway between the zero point nodes.

SUMMARY OF THE INVENTION

It is an object of the present invention to provide a method and apparatus for improving the bandpass characteristic of an acousto-optic tunable filter.

It is another object of the present invention to provide a method and apparatus for suppressing the sidebands of an acousto-optic tunable filter.

It is another object of the present invention to provide a method and apparatus for improving the bandpass characteristic of an acousto-optic tunable filter without significantly diminishing the peak transmission of the filter.

To achieve the above and other objects, the present invention provides an acousto-optic tunable filter comprising an optically birefringement crystal means, having a first part with an input face and a second part, for receiving light incident to the input face and for diffracting the light in the first part and in the second part; and acoustic means for launching acoustic waves into the first part and into the second part so that the diffraction of the first part subjects the incident light to filtering of a first bandpass characteristic and so that the diffraction of the second part subjects the light from the first part to filtering of a second bandpass characteristic.

The present invention also provides a method of improving the resolution of an acousto-optic light filter comprising an optically birefringement crystal having a first part with an input face and a second part, the method comprises the steps of applying incident light to the input face, launching acoustic waves of a first frequency into the first part so as to diffract the incident light and to subject the incident light to filtering of a first band pass characteristic; providing light from the first part to the second part; launching acoustic waves of a second frequency into the second part so as to diffract the light received by the second part and to subject the light received by the second part to filtering of a second bandpass characteristic.

DETAILED DESCRIPTION OF THE PREFERRED EMBODIMENTS

Figure 1:
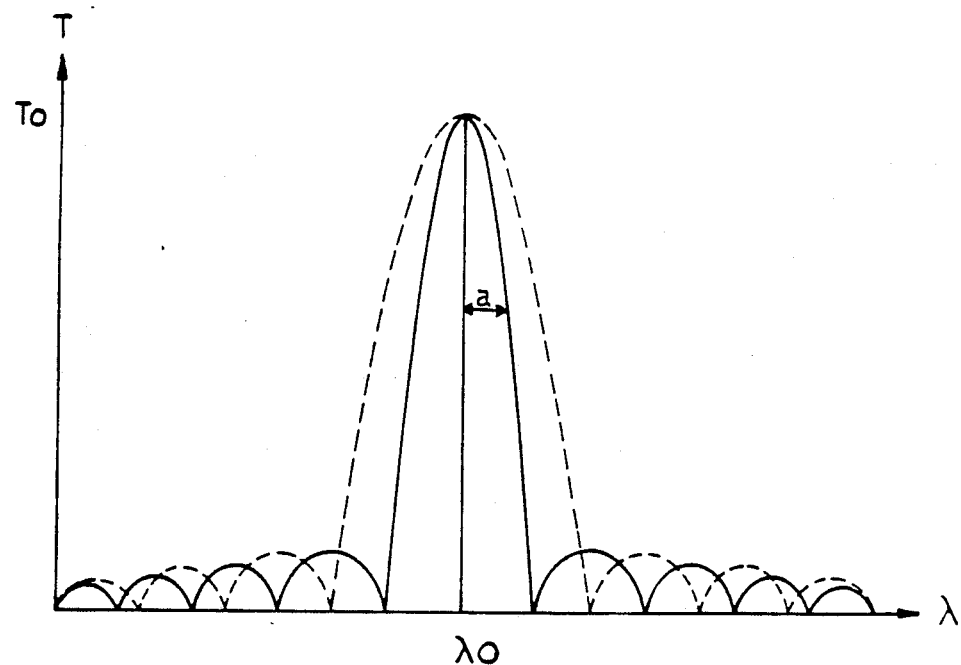
FIG. 1 illustrates the filter characteristics of two acousto-optic tunable bandpass filters.

The present invention employs two acoustic-optic tunable filters. The first has a characteristic exemplified by the solid line in FIG. 1. The second has a characteristic such as illustrated by the dotted line in FIG. 1. The order of the two filters can be reversed. The second filter has a bandwidth a'. The bandwidth a' is approximately 1.5a, where "a" is the bandwidth of the first filter. As shown in FIG. 1, the zero point nodes for the second filter fall approximately where the first filter's sideband maxima occur. This is especially true for the first few sidebands, where nearly all of the filter leakage occurs by way of unwanted sideband transmission. As seen in FIG. 1, the maxima and minima of the two filter functions do not precisely coincide. For higher sidebands, the minima of the second filter (dotted line) begins to approach the minima of the first filter. However, since almost all of the leakage occurs through the first sidebands, combining the first and second filter characteristics provides strong sideband suppression.

Figure 2:
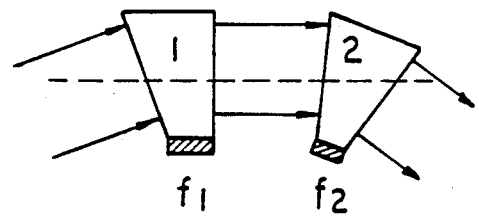
FIG. 2 schematically illustrates an acousto-optic filter according to the present invention.

If the first and second filters are placed in series as shown in FIG. 2, the filter characteristic of the combination is the product of the individual filter characteristics given by equation 1. Thus, a combined characteristic can be expressed as:

$$T_c = T_0 \times T_0' \times \frac{2.25 a^4}{\pi^4} \left[ \frac{\sin^2 \pi \Delta\lambda/a \cdot \sin^2 \pi \Delta\lambda/1.5a}{(\Delta\lambda)^4} \right] \tag{3}$$

where $T_0$ and $T_0'$ refer to the peak transmission values of the individual filters (1, 2) and $\Delta\lambda = (\lambda_0 - \lambda)$.

Table 1 shows a comparison of a single acousto-optic tunable filter and a pair of acousto-optic tunable filters in accordance with the present invention. Table I assumes that the two acousto-optic tunable filters are ideal filters, and therefore do not attenuate the peak transmission. It will be recognized by those skilled in the art that physical embodiments of filters have some small amount of attenuation.

TABLE I

|  | Single AOTF | Combined AOTF |
| --- | --- | --- |
| Peak Transmission | 100% | 100% |
| FWHM | 0.88a | 0.75a |
| Total Transmission | a | 0.63a |
| Total Transmission for equal main band FWHM | a | 0.74a |

Therefore, the actual peak transmission of a combined acousto-optic tunable filter according to the present invention will have a minimally reduced peak transmission due to the physical limitations of any embodiment. As is apparent from Table I, the FWHM bandwidth of the acousto-optic tunable filter of the present invention is reduced by about 15%; the total transmission is reduced by approximately 47%, which is mainly due to sideband rejection, and the total transmission for equal FWHM is reduced by approximately 26%, again mainly due to sideband rejection.

the unaffected peak transmission, the reduced FWHM bandwidth and significantly reduced total transmission are important characteristics when the spectral line width to be transmitted is much narrower than the filter bandpass, or when filter resolution is already as high as can be obtained from a single acousto-optic tunable filter. Obviously, the reduction of sideband is important when suppressed sidebands is of primary concern.

FIG. 2 illustrates an embodiment of an acousto-optic tunable filter in accordance with the present invention. While FIG. 2 illustrates two individual filters (1, 2), it is not necessary to separate the filters as shown in FIG. 2. The two filters can be joined together. In addition, it is possible to fabricate the two parts of the composite filter out of a single crystal.

In either case, the bandpass characteristic of an acousto-optic tunable filter depends upon the birefringence of the crystal. The birefringence of a crystal in turn, depends upon the orientation of the incident beam with respect to the optic axis of the crystal. Therefore, the two individual filters 1 and 2 shown in FIG. 2 have slightly different orientations of their crystal axes with respect to their individual input beams.

The following applies the teachings of the present invention to a filter with a 1 Å FWHM bandpass at 4000 Å. In accordance with the present invention, this requires a FWHM of 1.33 Å for the first filter and 2.0 Å for the second filter. The bandpass characteristics of the two filters were chosen so that the combined filter bandpass characteristic, being the product of the two filters, will be 1 Å. Note too, that the ratio of the two bandpass characteristics is 1.5, which is the desirable bandpass ratio as discussed above. It is not necessary for the first filter to actually receive the light first, since the order of the filters can be reversed. The desired incident angle is described in general terms by the anisotropic Bragg equations for acousto-optic diffractions as $$\sin \theta_i = \frac{1}{2n_i} \frac{\lambda f}{v} \left[ 1 + \left(\frac{v}{\lambda f}\right)^2 (n_i^2 - n_d^2) \right] \quad (4)$$

$$\sin \theta_d = \frac{1}{2n_d} \frac{\lambda f}{v} \left[ 1 - \left(\frac{v}{\lambda f}\right)^2 (n_i^2 - n_d^2) \right] \quad (5)$$

The needed acoustical frequency is defined by $$f_c = (v/\lambda) \sqrt{n_i^2 - n_d^2} . \quad (6)$$

Where v is the sound velocity, and $n_i$ and $n_d$ are the refractive indicies for the incident and diffracted beams, respectively. Using the above known circular birefringence of $TeO_2$, the following filter requirements are obtained, acoustic frequency: 53.3 MHz
crystal aperture: 4.35 cm
incident angle $\theta_i$: 15.9°.

For the second filter the filter requirements are:

acoustic frequency: 35.9 MHz
crystal aperture: 4.35 cm
incident angle $\theta_i$: 23.5°.

The above apply an acousto-optic tunable filter constructed using $TeO_2$. The angles of incidence are measured with respect to the crystal optic axis for each filter part. In the $TeO_2$ crystal, the principal or optic axis corresponds to the 001 crystal axis. The crystal aperture is arbitrary and is used merely as an example.

The two filters with characteristics described above are oriented with respect to each other as illustrated in FIG. 2 so that the incident angle requirement is satisfied. The important consideration is that the optic axis of each filter crystal is oriented as specified above. If the two filters are embodied in a single crystal, the design of the crystal uses the principle that, as the propagation direction of the acoustic wave moves away from the direction of maximum circular birefringence towards the optic axis, the term $\sqrt{n_i^2 - n_d^2}$ in the above equations gets smaller. Thus, the required frequency and resolution for a given aperture also diminish. By selecting the incident angle as well as the angle with respect to the 001 axis (for $TeO_2$) for the second filter, it is possible to use a single crystal with two acoustic transducers, each operating at the acoustic frequency as defined above. The acoustic frequency is defined by the required phase matching for the acousto-optic tunable filter, and is expressed by equation 6.

While the present invention has been described with respect to specific examples, the examples are not intended to limit the present invention, which instead is defined by the following claims.

What is claimed is:

1. An acousto-optic tunable filter comprising:
    optically birefringement crystal means, having a first part with an input face and a first optic axis and a second part with a second optic axis, for receiving light incident to the input face and for diffracting the light in said first part and in said second part; and
    acoustic means for launching acoustic waves into said first part and into said second part so that said diffraction of said first part subjects the incident light to filtering of a first bandpass characteristic having a center optical wavelength and so that said diffraction of said second part subjects light from the first part to filtering of a second bandpass characteristic being different than said first bandpass characteristic having said center optical wavelength.

2. An acousto-optic tunable filter according to claim 1, wherein said first and second optic axes are tilted with respect to each other.

3. An acoustic-optic tunable filter according to claim 1, wherein said first and second bandpass characteristics have a ratio of approximately 1.5.

4. An acoustic-optic tunable filter according to claim 2, wherein said first and second bandpass characteristics have a ratio of approximately 1.5.

5. A method of improving the resolution of an acousto-light filter comprising an optically birefringement crystal having a first part with an input face and a first optic axis and a second part with a second optic axis, said method comprising the steps of:

applying incident light to the input face at an angle with respect to the first optic axis;

launching acoustic waves at a first frequency into the first part so as to diffract the incident light and to subject the incident light to filtering of a first bandpass characteristic;

providing light from the first part to the second part at an angle with respect to the second optic axis; and launching acoustic waves of a second frequency into the second part so as to diffract the light received by the second part and to subject he light received by the second part to filtering of a second bandpass characteristic being different than said first bandpass characteristic.

6. A method of improving the resolution of an acousto-optic light filter according to claim 5, further comprising the step of selecting said first and second bandpass characteristics so as to have a ratio of approximately 1.5.

* * * * *